United States Patent [19]
Kurihara

[11] 3,862,403
[45] Jan. 21, 1975

[54] PLANT OPTIMIZING CONTROL DEVICE
[75] Inventor: Nobuo Kurihara, Hitachiota, Japan
[73] Assignee: Hitachi, Ltd., Tokyo, Japan
[22] Filed: Apr. 16, 1974
[21] Appl. No.: 461,344

[30] Foreign Application Priority Data
Apr. 20, 1973 Japan.............................. 48-44171

[52] U.S. Cl............................ 235/150.1, 122/448 R
[51] Int. Cl......................... F22b 35/18, F23n 3/00
[58] Field of Search............... 235/150.1; 122/448 R

[56] References Cited
UNITED STATES PATENTS
3,343,991  9/1967  Koenig................................. 136/86

Primary Examiner—Eugene G. Botz
Attorney, Agent, or Firm—Craig & Antonelli

[57] ABSTRACT

A plant optimizing control device in which a slight variation is caused in the input by applying a search signal to the input and the preset value of the input is adjusted on the basis of an optimizing signal so as to cause the operating point of the plant to give an optimum point by measuring the variation in the output corresponding to the variation in the input, the device comprising a first means for generating a periodical signal consisting of pseudo-random binary signals and serving as the search signal, a second means for obtaining a correlating signal with respect to the input and output of the plant, from a running mean within a period of the signal of the first means, the running mean being made in accordance with the expected plant characteristic; a third means for detecting the output of the plant, estimating from the detected value a dc component corresponding to the optimizing signal and obtaining a signal corresponding to the search signal which is equivalent to the detected value minus the dc component; a fourth means for obtaining from the outputs of the second and the third means the gradient of the variation in the output of the plant; and a fifth means for obtaining the optimizing signal of the plant from the fourth means.

8 Claims, 10 Drawing Figures

PLANT OPTIMIZING CONTROL DEVICE

The present invention relates to a plant optimizing control device which adjusts the plant input so that the operating point of the plant may be an optimum.

With the recent tendency of the plant to increase in scale, optimum control in addition to the conventional fixed-value control has been in great demand since a slight fluctuation of the plant efficiency results in a tremendous economic influence on a large-scale plant.

It is preferable to employ such an optimum control system in a boiler for thermal power generation, a turbine, a fractioning tower, a cracking furnace for naphtha etc. and the optimum control of a thermal power plant will be taken into consideration here.

With a thermal power plant, the overall efficiency $\eta$ is expressed by the formula $$\eta = \eta_b \cdot \eta_m \cdot \eta_i \cdot \eta_o \quad (1)$$

where $\eta_b$ is the boiler efficiency, $\eta_m$ the machine efficiency, $\eta_i$ the efficiency ratio, and $\eta_o$ the cycle ratio.

In the formula (1), $\eta_m$, $\eta_i$ and $\eta_o$ are uniquely determined, irrespective of the operating condition of the boiler, if the steam condition at the outlet port of the boiler is determined. In the optimum control of the thermal power plant, therefore, the plant efficiency can be improved by optimizing the control of the boiler efficiency $\eta_b$.

In case of controlling the efficiency of the boiler at the normal operation, for example, concerning the air excess rate and the main steam pressure, the improvement of the efficiency needs to choose an optimum air excess rate by controlling the flow of air in such a manner that the fuel quantity is minimized to maintain the main steam pressure at a predetermined value.

The relation between the air excess rate and the efficiency, unlike a simple linear characteristic, is represented as a non-linear characteristic having extreme values. The non-linear characteristic incessantly fluctuates owing to disturbances such as load variation, quality of fuel, caloric power, contamination on heat transfer surface etc. Accordingly, the operating point, i.e., extreme value, to give a maximum boiler efficiency will shift during the operation of the boiler so that even if the input is so determined at the time of start as to make the operating point of the boiler optimum, the operating point will deviate from the optimum condition during the operation of the boiler. In the optimum control, therefore, it is an important matter to search for extreme values. With a boiler in current use, which has a high efficiency, the extreme values must be searched with high accuracy.

According to one of the method of obtaining the extreme values to give the optimum operating point of the boiler, a stepwise or sinusoidal search signal is added to the boiler input to slightly affect the boiler output and the extreme values are obtained from the gradient of the variation of the output measured. This method exhibits, however, a very poor accuracy in searching for the extreme values without statistical treatment since the boiler output contains noise due to the mixing of noise in the boiler input and higher harmonics due to the non-linearity of the characteristic of the boiler proper. Moreover, since a specific input is applied to the boiler in operation, sufficient consideration must be taken so as not to disturb the operating condition of the boiler.

In view of the requirements mentioned above, it has been proposed that a pseudo-random binary signal should be used as a signal for searching the extreme values which, even if applied during the operation of the boiler, does not disturb the operating condition of the boiler, that is, which has a large S/N ratio.

As such a pseudo-random binary signal is known a signal called an M-sequence signal (maximum-length sequence signal). The M-sequence signal has a good S/N ratio so that it little disturbs the operating condition of the boiler even if it is applied as a search signal during the operation of the boiler and moreover it has such advantages as follows.

1. A signal approximately equal to white noise can be obtained easily.
2. The calculation of correlation functions is very simple.

The M-sequence signal is described in detail in the literature of the art concerned and the description of its details is omitted in this specification. Together with the advantages given above, the M-sequence signal, when used as a search signal in the optimum control of a boiler, also has the following disadvantages.

1. Since the boiler output contains the fluctuating components due to disturbances generated in the boiler itself or in the process of detection and due to the influence by the optimum control system itself, then the optimum control is adversely affected by the fluctuating components.
2. If the extreme value to give an optimum operating point shifts abruptly when the operating condition of the boiler is in the transient state, then the preset value of the boiler input abruptly shifts accordingly so that an undesirable operation control from the standpoint of stability is performed.
3. The use of the M-sequence signal as a search signal makes complicated the structure of the optimizing control device and in some cases causes the device to erroneously operate in response to noise and the fluctuation of the dynamic characteristics.

The object of the present invention is to provide an optimizing control device which uses a pseudo-random binary signal like M-sequence signal as a search signal in the optimum control of a plant and which makes possible a stable, optimum operation of the plant in its steady and transient states by utilizing such advantages as described above and eliminating such disadvantages as described above.

According to one of the features of the present invention, there is provided a plant optimizing control device in which a slight variation is caused in the input by applying a search signal to the input and the preset value of the input is adjusted on the basis of an optimizing signal so as to cause the operating point of the plant to give an optimum point by measuring the variation in the output corresponding to the variation in the input, the device comprising a first means for generating a periodical signal consisting of pseudo-random binary signals and serving as the search signal; a second means for obtaining a correlating signal with respect to the input and output of the plant, from a running means within a period of the signal of the first means; a third means for detecting the output of the plant, estimating from the detected value a dc component corresponding to the optimizing signal and obtaining a signal corresponding to the search signal which is equivalent to the detected value minus the dc component; a fourth means for obtaining from the outputs of the second and third means the gradient of the variation in the output of the plant; and a fifth means for obtaining the optimizing signal of the plant from the fourth means.

Other objects and features of the present invention will be apparent from the following description of the preferred embodiments with the aid of the attached drawings, in which.

Figure 1:
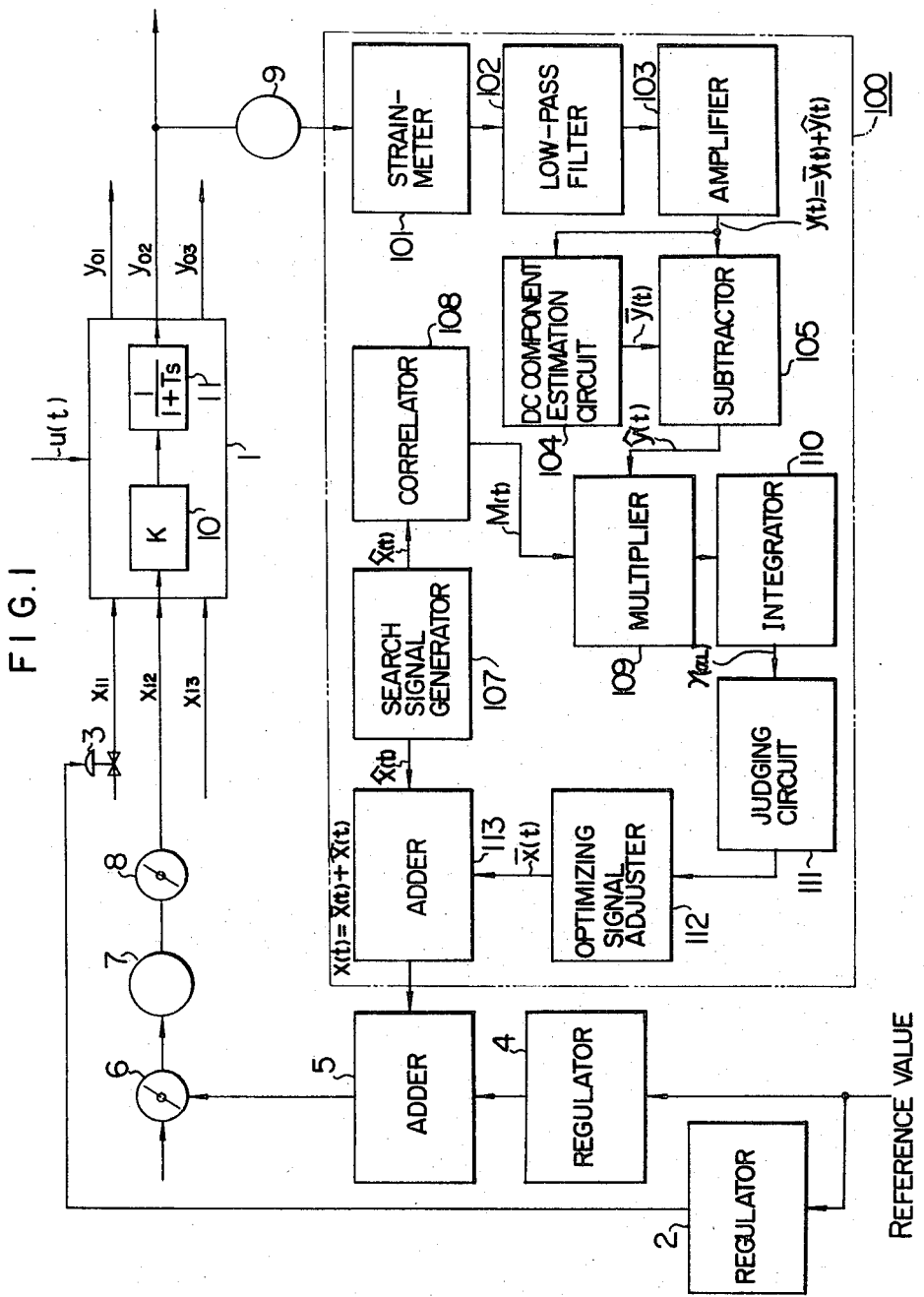
FIG. 1 shows one embodiment of a plant optimizing control device according to the present invention.

In FIG. 1 showing an embodiment of a plant optimizing control device according to the present invention, which is applied to the boiler for use in a thermal power generation, a boiler 1 to be controlled receives manipulated variables such as fuel quantity $x_{i1}$, quantity $x_{i2}$ of air flow and quantity $x_{i3}$ of flow of supplied water, which serve as external actions, i.e. disturbances $u(t)$, to change the condition of the control system. The boiler 1 in turn delivers main steam temperature $y_{o1}$ as controlled variable of temperature, main steam pressure $y_{o2}$ as controlled variable of pressure and $y_{o3}$ as controlled variable of flow quantity. The control system is so designed that a predetermined relationship may exist between the input and the output of the boiler 1. The fuel quantity $x_{i1}$ of the boiler 1 is controlled by adjusting the preset values of the opening degrees of a valve 3 with a regulator 2 in accordance with the reference value demanded by a load upon the boiler 1. On the other hand, the air flow quantity $x_{i2}$ of the boiler 1 is controlled by adding the output value of an optimizing control device 100 described later to a preset value adjusted by a regulator 4 and by adjusting the preset value of the opening degree of an entrance vane 6 through changing the preset value adjusted by the regulator 4 to a desired value. The air fed to the boiler 1 is introduced through the entrance vane 6, a ventilator 7 and an exit vane 8. In the optimum control of the efficiency of the boiler 1, attention will first be paid to the main steam pressure with respect to the air excess rate related, as described above, by the fuel quantity $x_{i1}$ and the air flow quantity $x_{i2}$. Since the quantity $x_{i1}$ of fuel flowing through the valve 3 is controlled by adjusting the opening degree of the valve 3 by the regulator 2 in accordance with the reference value of the load demand of the boiler 1, the efficiency of the boiler 1 can be maximized by so controlling the air flow quantity $x_{i2}$ that the main steam pressure $y_{o1}$ of the boiler 1 depending upon the fuel quantity $x_{i1}$ may be maximum.

Accordingly, the main steam pressure $y_{o2}$ of the boiler 1 is detected by a pressure detector 9 and the air flow quantity $x_{i2}$ to give the maximum main steam pressure with respect to the fuel quantity $x_{i1}$, that is, the optimum operating point of the boiler 1 to give the maximum boiler efficiency, is obtained by the optimizing control device 100 on the basis of the detected value $y_{o2}$. Then, the output of the optimizing control device 100 is added to the preset value from the regulator 4 through an adder 5, to be slightly changed so that the air flow quantity $x_{i2}$ of the boiler 1 is adjusted. As a result, the ratio of the air flow quantity $x_{i2}$ to the fuel quantity $x_{i1}$, i.e., air excess rate, becomes a value to give the maximum boiler efficiency so that the boiler 1 is operated at the optimum operating point.

Now, an investigation will be made into the characteristic of the boiler 1 with respect to the boiler efficiency. The transfer function $G(s)$ of the main steam pressure $y_{o2}$ with respect to the air flow quantity $x_{i2}$ is expressed by the following formula.

$$G(s) = K/1 + Ts \qquad (2)$$

Namely, the transfer function $G(s)$ has a first-order lag and the function $G(s)$ can be considered to be split into a non-linear element 10 having a transfer function $G_1(s) = K$ and a linear element 11 having a transfer function $G_2(s) = 1/(1 + Ts)$, as shown in FIG. 1. Since the transfer function $G_2(s) = 1/(1 + Ts)$ of the linear element 11 is uniquely determined according to the specification of the boiler 1 whereas the transfer function $G_1(s) = K$ of the non-linear element 10 is variable depending upon the operating condition, the environment of the boiler 1 and so on, then the transfer function $G_1(s) = K$ of the non-linear element 10 must be made maximum to operate the boiler 1 at the optimum operating point giving the maximum boiler efficiency.

Figure 2A:
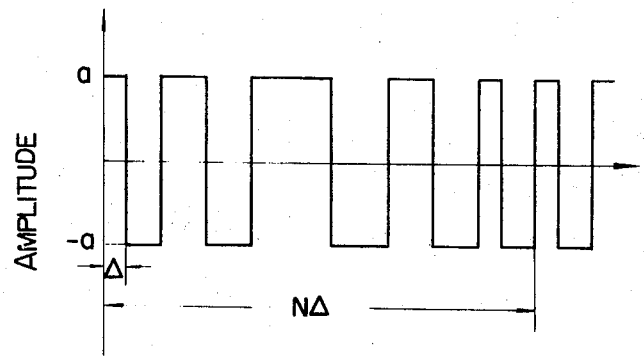
FIG. 2A shows an example of a search signal used in the embodiment shown in FIG. 1 and FIGS. 2B and 2C illustrate how the optimum operating point is obtained in the embodiment shown in FIG. 1.
Figure 2B:
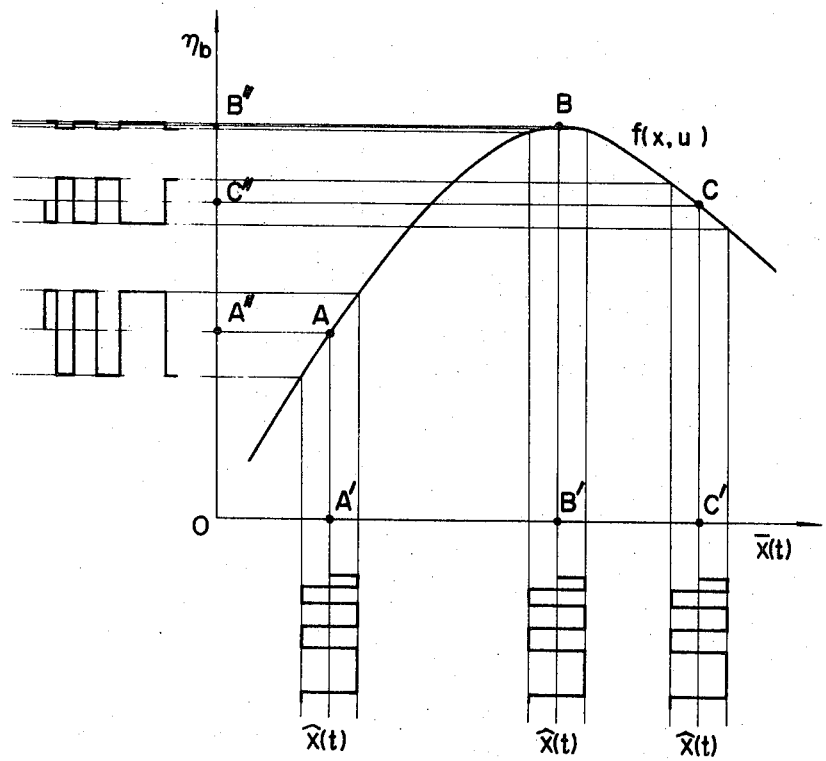

FIG. 2B shows the efficiency characteristic $f(x,u)$ of the boiler 1 concerning the non-linear element 10. The abscissa $\bar{x}(t)$ represents the optimizing signal to determine the optimum operating point and the ordinate $\eta_b$ the boiler efficiency with respect to the optimizing signal $\bar{x}(t)$. In other words, the abscissa and the ordinate represent the air excess rate and the main steam pressure, respectively.

In FIG. 2, when the air excess rate is so small, for example, that the operating point A of the boiler 1 may be at the point A' of the optimizing signal $\bar{x}(t)$, the boiler efficiency $\eta_b$ is located at the point A''. In this case, the boiler 1 is in the state of imperfect combustion and the efficiency decreases. On the contrary, when the air excess rate is so great that the operating point C of the boiler 1 is at the point C' of the optimizing signal $\bar{x}(t)$, the boiler efficiency $\eta_b$ is located at the point C''. In this case, the furnace temperature of the boiler 1 is lowered to decrease radiant heat transfer quantity, and the quantity of combustible gas increases to increase the velocity of gas passing through heat transfer surface so that when the increase in the heat absorption quantity can not follow that of the velocity, the temperature of the gas rises and heat loss increases. For the reasons mentioned above, the efficiency is lowered. It is therefore necessary to perform an optimizing control by obtaining the point B' of the optimizing signal $\bar{x}(t)$ corresponding to the operating point B of the boiler 1 which gives the point B'' of the maximum boiler efficiency $\eta_b$.

However, the efficiency characteristic shown in FIG. 2B incessantly fluctuates depending upon the disturbances such as the variation in load, the quality of fuel, the calorific power, and the contamination on the heat transfer surface. Consequently, the optimum operating point B to give the maximum boiler efficiency also fluctuates with time.

For this reason, in the optimizing control device 100, as shown in FIG. 2B, a search signal $\hat{x}(t)$ is superposed on the optimizing signal $\bar{x}(t)$ so as to be added as a manipulated variable to control the air flow quantity $x_{i2}$ of the boiler 1 and the optimum operating point B to give the maximum boiler efficiency irrespective of the operating condition of the boiler 1 may be determined from the gradient of the boiler efficiency characteristic obtained by slightly oscillating the air excess rate.

The small oscillation of the air excess rate by the search signal $\hat{x}(t)$ is actually performed by giving the quantity $x_{i2}$ of air flowing into the boiler 1 a small oscillation obtained by slightly oscillating the opening of the entrance vane 6 in synchronism with the search signal $\hat{x}(t)$. The search signal $\hat{x}(t)$ has so small an amplitude that the operating condition of the boiler 1 may not be disturbed by the resulting oscillation of the entrance vane 6. As this search signal $\hat{x}(t)$ is used a pseudo-random binary signal, as described above, an example of which is an M-sequence signal shown in FIG. 2A. As already described above, the feature of the M-sequence signal is omitted here. The M-sequence signal shown in FIG. 2A is a periodic signal having a minimum pulse duration of $\Delta$, an amplitude of $a$ and a period of $N\Delta$ and contain an infinite number of frequency components. If the M-sequence signal is integrated over a period $N\Delta$, the mean value $a/N$ is nearly zero.

If the M-sequence signal is used as a search signal $\hat{x}(t)$ to obtain an extreme value corresponding to the optimum operating point of the boiler 1, the polarity and amplitude of the output of the boiler efficiency $\eta_b$ with respect to the search signal $\hat{x}(t)$ vary with the operating point of the boiler 1, i.e., the amplitude of the optimizing signal $\bar{x}(t)$, as apparent from FIG. 2B. At the optimum operating point B, the output of the boiler efficiency $\eta_b$ with respect to the search signal $\hat{x}(t)$ is nearly zero. Since the amplitude of the search signal $\hat{x}(t)$ is very small, the efficiency characteristic $f(x, u)$ can be considered linear within a small range. Accordingly, the gradient of the boiler efficiency characteristic $f(x,u)$ within the small range of the amplitude of the search signal $\hat{x}(t)$ can be obtained with high accuracy and an extreme value to give the optimum operating point of the boiler 1 can be obtained in view of the gradient. The optimum control of the boiler 1 using the M-sequence signal as search signal $\hat{x}(t)$ will be described in detail below with the aid of mathematical reasoning.

As apparent from FIG. 2B, the manipulated variable $x(t)$ which may be represented by the air flow quantity $x_{i2}$ controlled by the optimum control device 100, is the sum of the optimizing signal $\bar{x}(t)$ and the M-sequence signal $\hat{x}(t)$ such that $$x(t) = \bar{x}(t) + \hat{x}(t) \qquad (3)$$

On the other hand, the controlled variable $y(t)$ of the main steam pressure $Y_{02}$ of the boiler 1 detected by the pressure detecter 9 satisfies a similar condition such that $$y(t) = \bar{y}(t) + \hat{y}(t) \qquad (4)$$

where the components $\bar{y}(t)$ and $\hat{y}(t)$ correspond respectively to the components $\bar{x}(t)$ and $\hat{x}(t)$.

It should be noted that since the M-sequence signal $\hat{x}(t)$ as search signal has a very small amplitude, the efficiency characteristic within the small range may be considered linear, as seen in FIG. 2B. Accordingly, by the use of the impulse response $g(\tau)$ of the boiler 1, the formula (4) is transformed as follows.

$$y(t) = \int_0^{N\Delta} g(\tau)\{\bar{x}(t) + \hat{x}(t-\alpha)\}d\tau \qquad (5)$$

$$\begin{cases} \bar{y}(t) = \int_0^{N\Delta} g(\tau)\bar{x}(t)d\tau \\ \hat{y}(t) = \int_0^{N\Delta} g(\tau)\hat{x}(t-\alpha)d\tau \end{cases}$$

In addition, the correlation function $\phi_{\hat{x}y}(\alpha)$ of $\hat{x}(t)$ and $y(t)$ can be expressed, by the use of the correlation function $\phi_{\hat{x}\hat{x}}(\alpha)$ of $\hat{x}(t)$ and $\hat{y}(t)$, such that $$\phi_{\hat{x}y}(\alpha) = \int_0^{N\Delta} g(\tau)\phi_{\hat{x}\hat{y}}(\alpha - \tau)d\tau \qquad (6)$$

On the other hand, the M-sequence signal serving as search signal $\hat{x}(t)$ is represented by the function shown in FIG. 2A and in the form of white noise having an infinite number of frequency components so that the power spectral density function $\Phi_{\hat{x}\hat{x}}(\omega)$ of the search signal $\hat{x}(t)$ can be regarded as constant. It follows therefore that $$\Phi_{\hat{x}\hat{x}}(\omega) = \Phi_{\hat{x}\hat{x}}(0) \qquad (7)$$

Accordingly, as apparent from the expression (6), the inpulse response (weighting function) $g(\alpha)$ is expressed by the formula such that $$g(\alpha) = \phi_{\hat{x}\hat{x}}(\alpha)/\Phi_{\hat{x}\hat{x}}(0) \qquad (8),$$

where $$\Phi_{\hat{x}\hat{x}}(0) = \int_0^{N\Delta} \phi_{\hat{x}\hat{x}}(\tau)d\tau$$

It follows therefore that $$\Phi_{\hat{x}\hat{x}}(0) = N + 1/2N \cdot a\Delta = Z(=\text{const.}) \qquad (9)$$

The formula (8) can be transformed, by the use of expressions (4) and (9), as follows.

$$g(\alpha) = 1/Z\{\phi_{\hat{x}y}(\alpha) - \phi_{\hat{x}\bar{y}}(\alpha)\} \qquad (10)$$

and therefore $$g(\alpha) = \frac{1}{Z}\left\{\phi_{\hat{x}y}(\alpha) - \frac{1}{\alpha_2 - \alpha_1}\int_{\alpha_1}^{\alpha_2}\phi_{\hat{x}y}(\alpha)d\alpha\right\} \quad (11)$$

where the second term of the expression (11) is the approximation of $\phi_{\hat{x}\hat{y}}(\alpha)$ in the expression (10) and the integrating limits $\alpha_1$ and $\alpha_2$ are the extremes of the interval of the values of $\alpha$ within which the impulse response $g(\alpha)$ of the boiler 1 is completely established.

Therefore, the indicial response $\gamma(\alpha_L)$ which is obtained by integrating the impulse response $g(\alpha)$ given by the formula (11) with respect to time, gives the gradient of the efficiency characteristic shown in FIG. 2B.

Hence, $$\gamma(\alpha_L) = \frac{1}{Z}\int_{\alpha_S}^{\alpha_L}\left\{\phi_{\hat{x}y}(\alpha) - \frac{1}{\alpha_2 - \alpha_1}\int_{\alpha_1}^{\alpha_2}\phi_{\hat{x}y}(\alpha)d\alpha\right\}d\alpha$$

$$= \frac{1}{Z}\int_{\alpha_S}^{\alpha_L}\left\{\frac{1}{N\Delta}\int_0^{N\Delta}\hat{x}(t-\alpha)\cdot y(t)dt\right.$$

$$\left.- \frac{1}{N\Delta(\alpha_2 - \alpha_1)}\int_{\alpha_1}^{\alpha_2}\int_0^{N\Delta}\hat{x}(t-\alpha)y(t)dtd\alpha\right\}d\alpha$$

$$= \frac{1}{N\Delta Z}\int_0^{N\Delta}\left\{\int_{\alpha_S}^{\alpha_L}\hat{x}(t-\alpha)d\alpha\right.$$

$$\left.- \frac{\alpha_L - \alpha_L}{\alpha_2 - \alpha_1}\int_{\alpha_1}^{\alpha_2}\hat{x}(t-\alpha)d\alpha\right\}y(t)dt$$

$$= \frac{1}{N\Delta Z}\int_0^{N\Delta}M(t)y(t)dt \quad (12)$$

where $\alpha_S$ and $\alpha_L$ are instants at which the integration is started and stopped and $M(t)$ is called a correlation signal and expressed such that $$M(t) = \int_{\alpha_S}^{\alpha_L}\hat{x}(t-\alpha)d\alpha - \frac{\alpha_S - \alpha_L}{\alpha_1 - \alpha_2}\int_{\alpha_1}^{\alpha_2}\hat{x}(t-\alpha)d\alpha \quad (13)$$

In order to facilitate the calculation of the function correlating the input with the output of the boiler 1, the correlation signal $M(t)$ is not the M-sequence signal itself but a modified one which represents the difference between two running means within a predetermined range defined in view of the plant characteristic estimated within a period of the M-sequence signal.

Accordingly, the indicial response $\gamma(\alpha_L)$ is given, by the use of the formulae (4) and (12), by the following expression.

$$\gamma(\alpha_L) = \frac{1}{N\Delta Z}\left\{\int_0^{N\Delta}M(t)\bar{y}(t)dt + \int_0^{N\Delta}M(t)\hat{y}(t)dt\right\} \quad (14)$$

There is a relationship between the indicial response $\gamma(\alpha_L)$ and the characteristic $f(x,u)$ of the non-linear element 10 of the boiler 1. Namely, since the M-sequence signal as search signal $\hat{x}(t)$ has a very small amplitude, the efficiency characteristic $f(x,u)$ within the small range may be considered linear so that its transfer function $G(s,x,u)$ satisfies the following equations.

$$\left.\frac{\partial f(x,u)}{\partial x}\right|_{x=\bar{x}} = G(o,x,u) \quad (15)$$

$$G(o,x,u) = \gamma(N\Delta) \approx \gamma(\alpha_L) \quad (16)$$

where $u$ is the disturbance.

Since the indicial response $\gamma(\alpha_L)$ gives the gradient of the efficiency characteristic $f(x,u)$ as seen from the formulae (15) and (16), the gradient of the boiler efficiency characteristic $f(x,u)$ shown in FIG. 2B can be obtained from the correlation signal $M(t)$ and the output $y(t)$ of the main steam pressure $y_{o2}$ as the controlled variable of the boiler 1, as seen from the formula (12). If the optimizing signal $\bar{x}(t)$ is changed in proportion to the values of $\gamma(\alpha_L)$, the operating point of the boiler 1 can be settled at the optimum point, that is, the optimum control of the boiler 1 is possible.

However, since the characteristic $f(x,u)$ obtained from the formula (10) is expressed in the form of the formula (14), the term $$\int_0^{N\Delta}M(t)\bar{y}(t)dt \quad (17)$$

in the formula (14) is the error caused in the case of calculating $\gamma(\alpha_L)$. This is because $\gamma(\alpha_L)$ cannot be a correct value unless $\gamma(\alpha_L)$ is calculated from the correlation function $\phi_{\hat{x}\hat{y}}(t)$ of the M-sequence signal as search signal $x(t)$ and the component $\hat{y}(t)$ of the boiler output $y(t)$, on the basis of the relation such that $$\gamma(\alpha_L) = \frac{1}{Z}\int_{\alpha_S}^{\alpha_L}\phi_{\hat{x}\hat{y}}(\alpha)d\alpha \quad (18)$$

Since the correlation signal $M(t)$ can be calculated from the search signal $\hat{x}(t)$ whose mean value over a period is zero, the error given by the expression (17) can be easily eliminated if that dc component $\bar{y}(t)$ of the boiler output $y(t)$ which corresponds to the optimizing signal $\bar{x}(t)$ is constant. However, as described above, the output $y(t)$ of the boiler 1 contains fluctuating components such as disturbances produced in the plant or in the process of detection and influences by the optimizing control device itself so that the dc component $\bar{y}(t)$ cannot be constant. Moreover, it is very difficult to detect only the component $\bar{y}(t)$ which equals the boiler output $y(t)$ minus the dc component $\bar{y}(t)$. It is therefore an important problem, for the purpose of improvement in the stability of the optimum control of a plant, to correctly calculate the gradient $\gamma(\alpha_L)$ of the characteristic $f(x,u)$.

According to the present invention, the dc component $\bar{y}(t)$ is estimated from the output $y(t)$ of the boiler 1, the component $\hat{y}(t)$ is obtained by subtracting the dc component $\bar{y}(t)$ from the output $y(t)$ and the correct value for $\gamma(\alpha_L)$ is calculated from the component $y(t)$. In this case, the real value of $\gamma(\alpha_L)$ is, from the formula (14), such that $$\gamma(\alpha_L) = \frac{1}{N\Delta Z}\int_0^{N\Delta}M(t)\hat{y}(t)dt \quad (19)$$

Now, the constitution of the optimizing control device 100 which gives the value of $\gamma(\alpha_L)$ shown in the formula (19) and produces an input as the manipulated variable of the boiler 1 will be described with reference to FIG. 1.

The output $y(t)$ of the main steam pressure $y_{o2}$ of the boiler 1 is detected by a pressure detector 9 and the detected value is obtained through a strainmeter 101, a low-pass filter 102 and an amplifier 103. The output $y(t)$ of the amplifier 103 is the one wherein the disturbance in the form of spikes is eliminated from the output of the pressure detector 9. The output $y(t)$ is fed to a dc component estimation circuit 104, which estimates the dc component $\bar{y}(t)$ of the output $y(t)$. The details of the dc component estimation circuit 104 will be described later. A subtractor 105 performs the subtracting operation of the output $y(t)$ of the amplifier 103 and the dc component $\bar{y}(t)$ estimated by the dc component estimation circuit, and delivers the signal $\hat{y}(t)$ corresponding to the M-sequence signal as search signal $\hat{x}(t)$.

On the other hand, a search signal generator 107 generates an M-sequence signal as search signal $\hat{x}(t)$ as shown in FIG. 2A. A correlator 108 receives the search signal $\hat{x}(t)$ from the search signal generator 107, and generates such a correlation signal $M(t)$ given by the formula (13). The details of the search signal generator 107 and the correlator 108 will be described later.

A multiplier 109 makes a product of the output $M(t)$ of the correlator 108 and the output $\hat{y}(t)$ of the subtractor 105 and the product $M(t)\hat{y}(t)$ is then integrated by an integrator 110. Accordingly, the output $\gamma(\alpha_L)$ is what is given by the formula (19) so that the correct gradient of the boiler efficiency characteristic $f(x,u)$ is obtained as the output of the integrator 110.

Figure 2C:
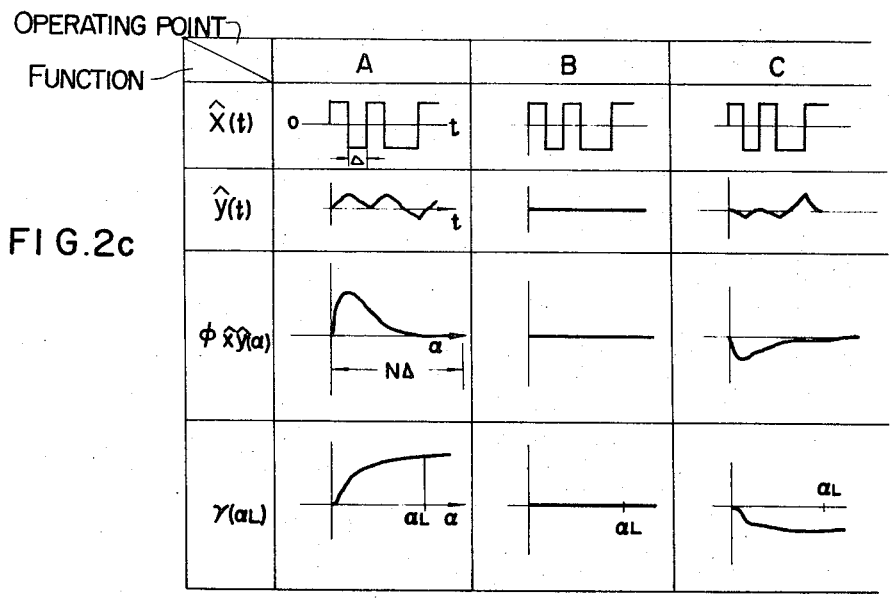

The output $\gamma(\alpha_L)$ is the indicial response of the boiler characteristic and $\gamma(\alpha_L)$ given by the formula (19) equals the value obtained by integrating the correlation function $\phi_{\hat{y}\hat{x}}(t)$ of $\hat{x}(t)$ and $\hat{y}(t)$, as seen in the formula (18). FIG. 2C therefore shows the mode of variation in the indicial response $\gamma(\alpha_L)$ corresponding to the amplitudes of the optimizing signal $\bar{x}(t)$ at the respective operating points A – C of the boiler 1 shown in FIG. 2A. As apparent from FIG. 2C, the amplitude and the polarity of the indicial response $\gamma(\alpha_L)$ vary depending upon the amplitude of the optimizing signal $\bar{x}(t)$. If the amplitude of the optimizing signal $\bar{x}(t)$ is so controlled as to satisfy the condition $\gamma(\alpha_L) = 0$, the boiler 1 is to be operated at the maximum efficiency. A judging circuit 111 receives the output $\gamma(\alpha_L)$ of the integrator 110 and judges whether $\gamma(\alpha_L)$ is changed normally or not, by calculating the variances of plural values of $\gamma(\alpha_L)$ time-sequentially received within a predetermined period. When the judging circuit 111 judges the variance of $\gamma(\alpha_L)$ to be normal, the circuit 111 delivers the output of the integrator 110 as it is while when the result of the judgement is abnormal, the circuit 111 delivers that output of the integrator 110 which is delivered in the case where the variance is normal. An optimizing signal adjuster 112 receives the output of the judging circuit 111 and delivers an optimizing signal $\bar{x}(t)$ in proportion to the amplitude and polarity of the output $\gamma(\alpha_L)$ of the judging circuit 111. The details of the judging circuit 111 will be described later.

The output $\bar{x}(t)$ of the optimizing signal adjuster 112 and the search signal $\hat{x}(t)$ from the search signal generator 107 are combined together in an adder 113 and the sum $\bar{x}(t) + \hat{x}(t)$, which is the output $x(t)$ of the optimizing control device 100, is fed to the adder 5.

The judging circuit 111 is not necessarily indispensable for the optimizing control device 100 but it is incorporated in the device 100 for the reason as follows. Namely, if the optimizing signal $\bar{x}(t)$ is changed following the sudden change of the output $\gamma(\alpha_L)$ of the integrator 110 which was caused in the transient state of the boiler 1, the stability of the boiler 1 is disturbed and no effect to improve the efficiency can be obtained.

The details of the parts of the optimizing control device 100 will be described below.

Figure 3:
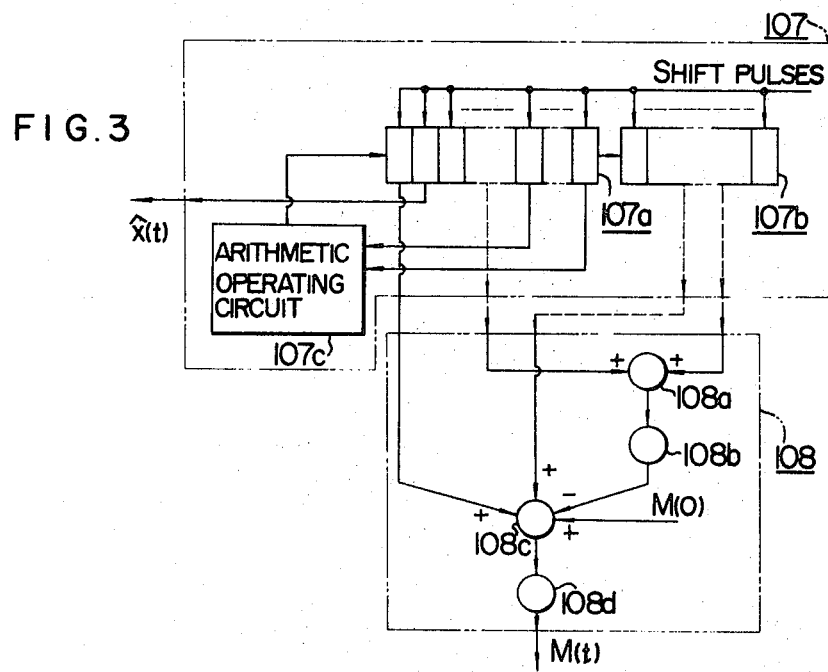
FIG. 3 shows in further detail a part of the embodiment shown in FIG. 1.

FIG. 3 shows the details of the search signal generator 107 and the correlator 108. The M-sequence signal as search signal $\hat{x}(t)$ is generated by a $n$-bit shift register 107a consisting of flip-flops in which register 107a the result $A i A n + \overline{A i A n}$ of the logical operation by an arithmetic operating circuit 107 of the values $A i$ and $A n$ of the $i$-th and $n$-th bits of the shift register 107a is fed back to the flip-flop corresponding to the first bit of the register 107a. The period of the M-sequence signal $N\Delta$ is such that $$N\alpha = (2^n - 1)\Delta,$$

where $\Delta$ is the period of a shift pulse signal applied to the shift register 107a.

In the search signal generator 107, a shift register 107b having $\{2^n - (n+1)\}$ bits is connected in series with the flip-flop for $n$-th bit of the shift register 107a so as to obtain the correlation signal $M(t)$. From the shift register 107b is delivered a signal which is a fractional part of the M-sequence signal per a period $N\Delta$ of the M-sequence signal.

The correlator 108 generates the correlation signal $M(t)$ given by the formula (13), by reading the values of certain bits of the shift registers 107a and 107b in the search signal generator 107. By an adder 108a, the values of certain bits of the shift registers 107a and 107b are read and the running mean value corresponding to the integration $$\int_{\alpha_1}^{\alpha_2} \hat{x}(t-\alpha)d\alpha$$

within the interval $(\alpha_1 - \alpha_2)$ of the M-sequence signal is obtained. The output of a coefficienter 108b, which defines the value of $(\alpha_L - \alpha_S)/(\alpha_2 - \alpha_1)$, corresponds to the second term of the correlation signal $M(t)$ given by the formula (13). By an adder 108c, the value corresponding to the integration $$\int_{\alpha_S}^{\alpha_L} \hat{x}(t-\alpha)d\alpha$$

within the interval $(\alpha_S - \alpha_L)$ of the M-sequence signal, i.e., corresponding to the running mean of the first term of the correlation signal $M(t)$ given by the formula (13), is obtained from the values of the associated bits of the shift registers 107a and 107b. Namely, the adder 108c combines the value corresponding to the running mean, the output of the coefficienter 108b and an initial value $M(o)$ for the correlation signal $M(t)$ together. The sum is multiplied by a predetermined factor in a coefficienter 108d and the output of the coefficienter 108d gives the value of the correlation signal $M(t)$ represented by the formula (13).

Those values of the shift registers 107a and 107b in the search signal generator 107 which are to be taken in the correlator 108, are appropriately selected according to the plant characteristic and the initial value $M(o)$ is also selected accordingly.

If the indicial response $\gamma(\alpha_L)$ to give the gradient of the boiler efficiency characteristic $f(x,u)$ is calculated from the thus obtained correlation signal $M(t)$ which is the difference between the running means within a specific interval of the M-sequence signal, then the stability in boiler operation is by no means disturbed by noise or characteristic variation concerning the boiler 1.

Figure 4:
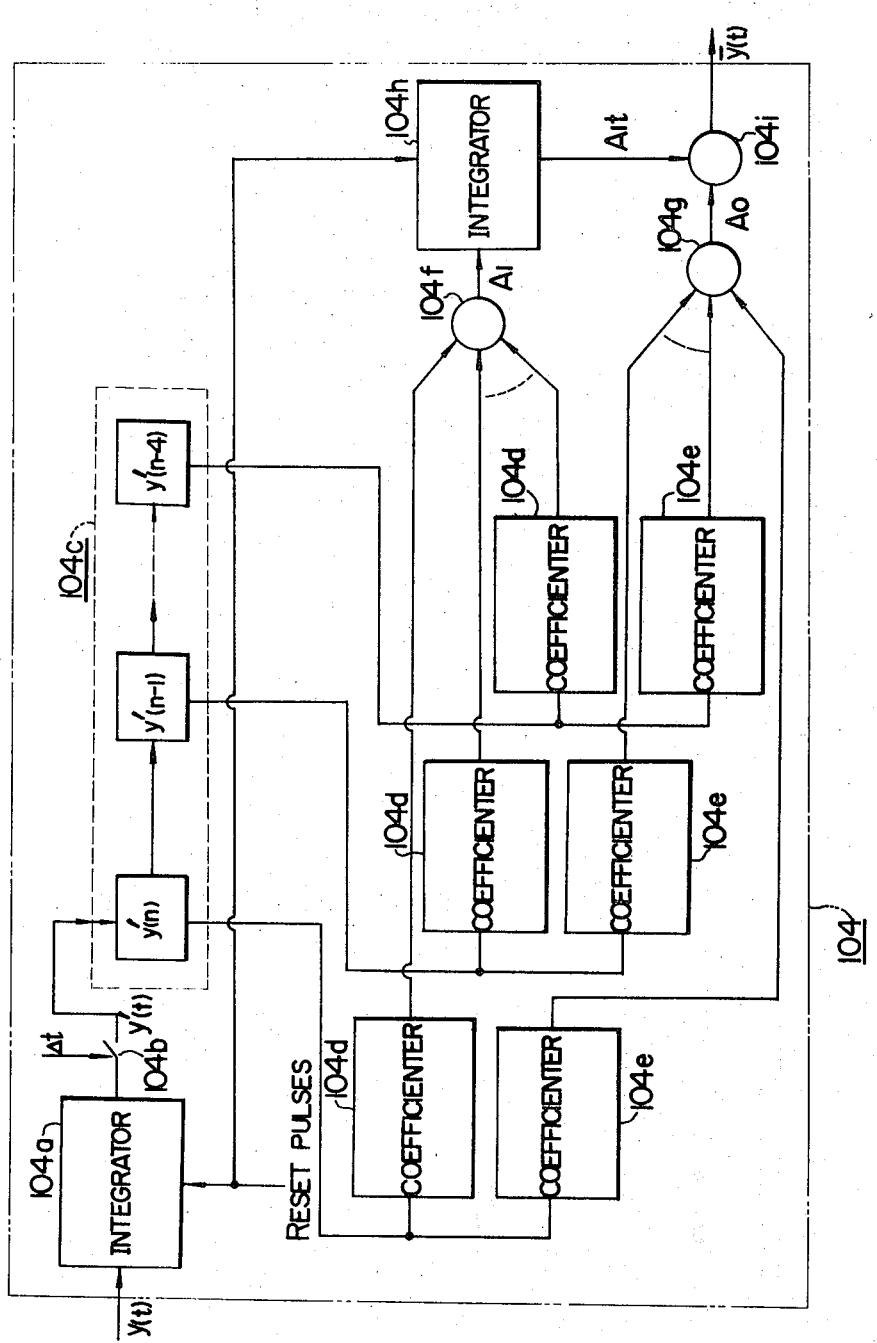
FIG. 4 shows in further detail another part of the embodiment shown in FIG. 1.
Figure 5:
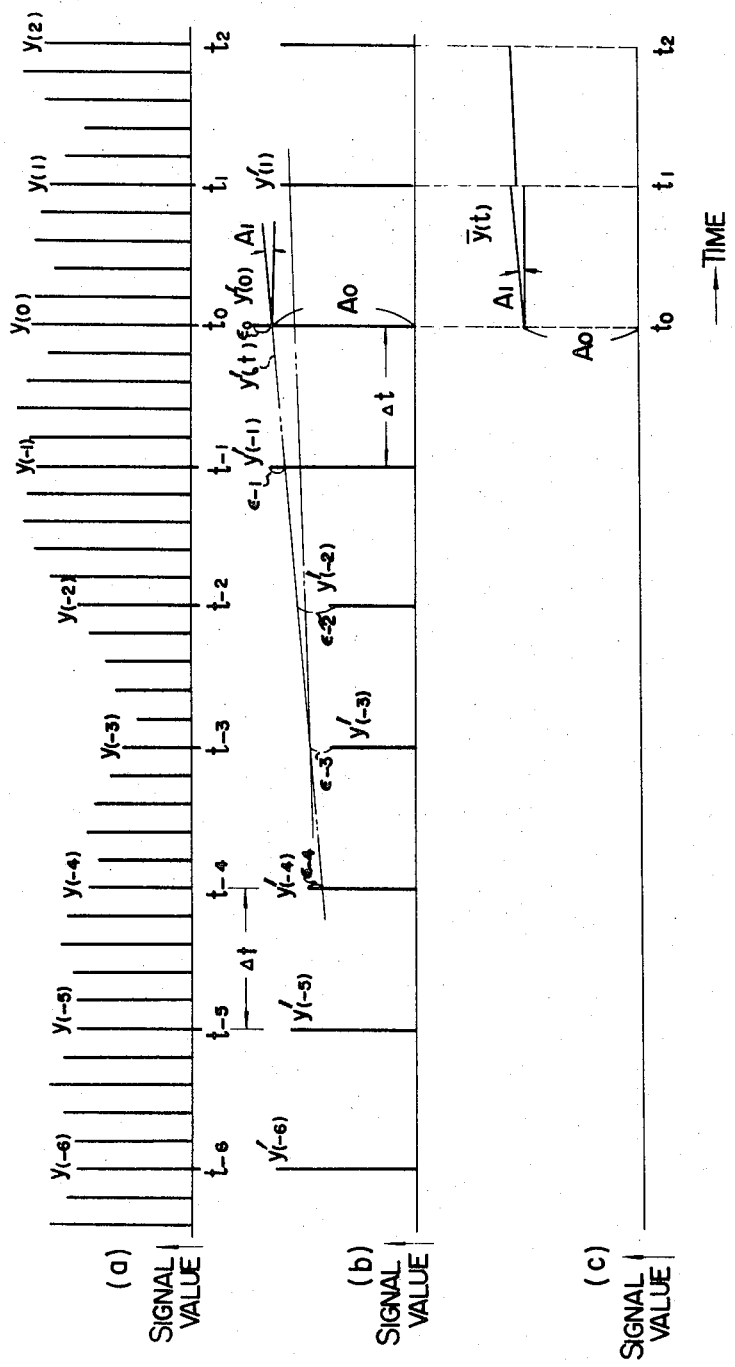
FIG. 5 shows diagrams useful to explain the operation of the structure shown in FIG. 4.

The details of the dc component estimation circuit 104 will be described with the aid of FIGS. 4 and 5. FIG. 4 shows a concrete circuit of the dc component estimater 104 and FIG. 5 shows diagrams useful to understand the operation of the circuit. In FIG. 4, an integrator 104a serves to integrate the boiler output $y(t)$ as seen in the diagram (a) in FIG. 5. The boiler output $y(t)$ integrated by the integrator 104a is read in a memory circuit 104c by closing a switch 104b at a constant interval of a period $\Delta t$. The output $y'(t)$ of the integrator 104a stored in the memory circuit 104c is as shown in the diagram (b) in FIG. 5. If the boiler output $y(t)$ is of digital quantity as shown in the diagram (a) in FIG. 5, the information $y'(t)$ stored in the memory circuit 104c is represented as the sum of the boiler outputs $y(t)$ contained within the period $\alpha t$.

The memory circuit 104c consists of five memory units $y'(n)$, $y'(n-1)$, ....., $y'(n-4)$ and stores five pieces of information constituting the output $y'(t)$ of the integrator 104a. Namely, if the read epoch at present is assumed to be $t_o$, then the memory unit $y'(n)$ stores the value $y'(o)$ at the read epoch $t_o$, the memory unit $y'(n-1)$ the value $y'(-1)$ at the reach epoch $t_{-1}$, the memory unit $y'(n-2)$, the value $y'(-2)$ at the read epoch $t_{-2}$, and the memory unit $y'(n-4)$ the value $y'(-4)$ at the read epoch $t_{-4}$. At the next read epoch $t_1$, the values of the memory units $y'(n)$ to $y'(n-4)$ of the memory circuit 104c shift respectively, that is, the memory unit $y'(n)$ stores the value $y'(1)$, the memory unit $y'(n-1)$ the value $y'(o)$, the memory unit $y'(n-2)$ the value $y'(-1)$ and the memory unit $y'(n-4)$ the value $y'(-3)$.

The integrator 104a is reset, after the switch 104b has been closed and the output $y'(t)$ of the integrator 104a has been read in the memory circuit 104c, by reset pulses and again integrates the boiler output $y(t)$.

The dc component estimation circuit 104 estimates the dc component $\bar{y}(t)$ contained in the boiler output $y(t)$, through the linean approximation of the five pieces of information constituting the output $y'(t)$ of the integrator 104a read in the respective memory units $y'(n)$ to $y'(n-4)$ time-sequentially at intervals of a constant period $\Delta t$. Namely, the five pieces of information $y'(o)$ to $y'(-4)$ stored at the read epoch $t_o$ in the memory circuit 104c are linearly approximated by a straight line $y'(t)$ as shown in FIG. 5. In this case, the initial value $A_o$ and the gradient $A_1$ at the epoch $t_o$ are obtained from a straight line such that the sum of the squares of the deviations $\epsilon_0$ to $\epsilon_{-4}$ of $y'(o)$ to $y'(-4)$ from $y'(t)$:

$$(\epsilon_o)^2 + (\epsilon_{-1})^2 + (\epsilon_{-2})^2 + (\epsilon_{-3})^2 + (\epsilon_{-4})^2$$

(20)

is minimized. The values of $y'(t)$ from $t_o$ to $t_1$ are estimated from the initial value $A_o$ and the gradient $A_l$ and the estimated values of $y'(t)$ are used as the dc component $\bar{y}(t)$ of the boiler output $y(t)$ from $t_o$ to $t_1$.

The initial value $A_o$ and the gradient $A_l$ of the straight line $y'(t)$ which minimize the sum of the squares of the deviations, given by the expression (20), are obtained by the following expressions.

$$A_o = 1/5\{-y'(n-4) + y'(n-2) + 2y'(n-1) + 3y'(n)\}$$

(21)

$$A_l = -1/5\{y'(n-4) + \tfrac{1}{2}y'(n-3) - \tfrac{1}{2}y'(n-1) - y'(n)\}$$

(22)

Accordingly, the contents of the memory units $y'(n)$ to $y'(n-4)$ of the memory circuit 104c are multiplied by factors defined in the expressions (21) and (22) by means of coefficienters 104d and 104e so that an adder 104f gives the gradient $A_1$ represented by the expression (22) while an adder 104g gives the initial value $A_o$ represented by the expression (21). The gradient $A_l$ obtained from the adder 104f is held by an integrator 104h until the next information has been read in the memory circuit 104c, so that the output of the integrator 104h is $A_l t$. Accordingly, the dc component $\bar{y}(t)$ of the boiler output $y(t)$ is obtained as the output ($A_l t + A_o$) of an adder 104i, as shown in the diagram (c) of FIG. 5.

In like manner, the initial values $A_o$ and the gradients $A_l$ at read epochs $t_1$, $t_2$, —— are determined so that each dc component within a period $\Delta t$ is estimated accordingly.

In the above embodiment, the number of the memory units in the memory circuit 104 is five but the optimum number of the units should be determined according to the plant to be controlled.

Figure 6:
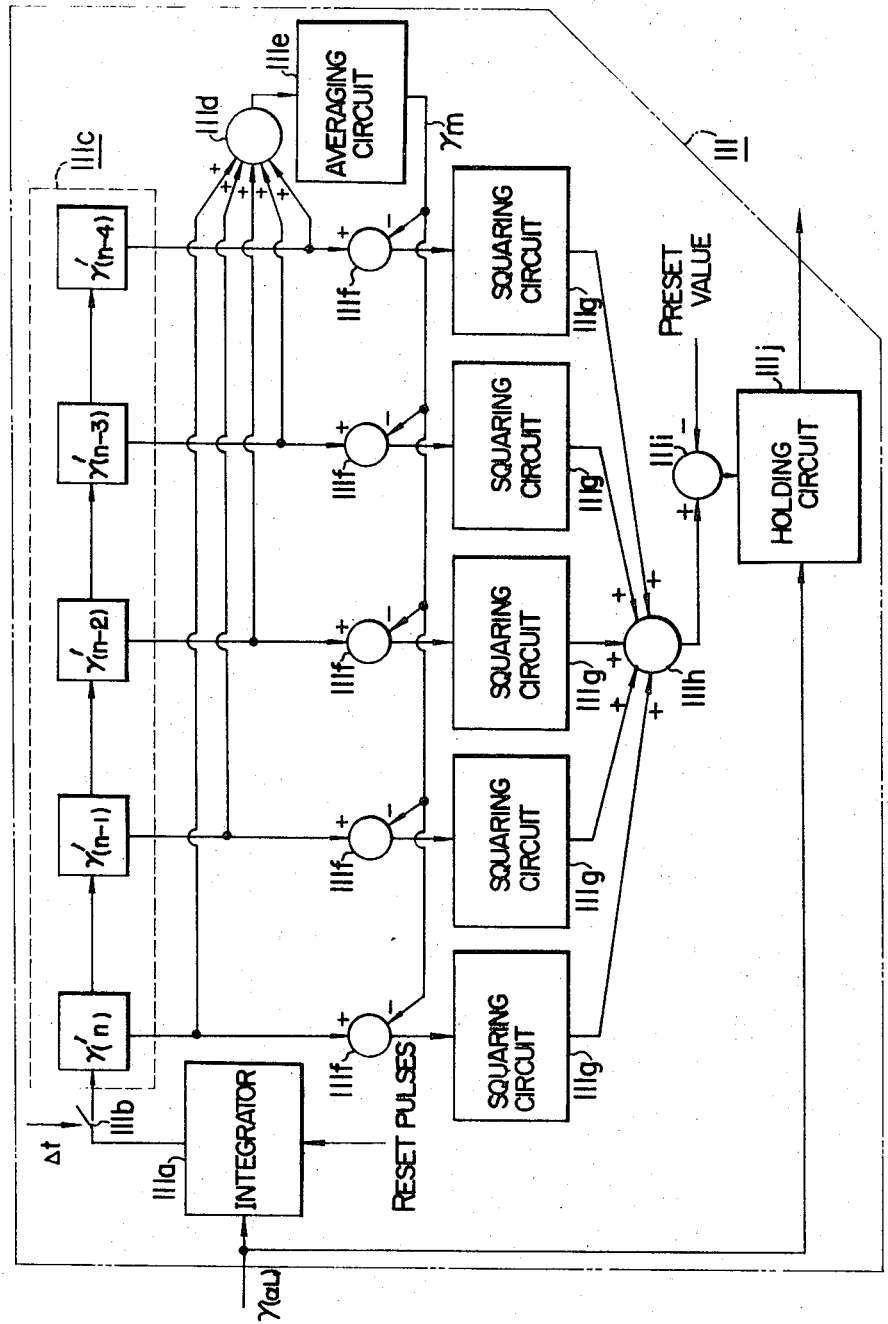
FIG. 6 shows in further detail yet another part of the embodiment shown in FIG. 1.

FIG. 6 shows the details of the judging circuit 111 which calculates the variances of plural indicial responses $\gamma(\alpha_L)$ read in time-sequentially at a constant period and judges whether $\gamma(\alpha_L)$ is changed normally or not. The judging circuit 111 has a structure similar to that of the dc component estimation circuit 104 shown in FIG. 4. As seen in FIG. 6, the indicial response $\gamma(\alpha_L)$ is integrated by an integrator 111a and the integrated value is read in a memory circuit 111c by closing a switch 111b at a period of $\Delta t$. The memory circuit 111c consists of five memory units $\gamma'(n)$, $\gamma'(n-1)$, ——, $\gamma'(n-4)$, receives the output of the integrator 111a at a period $\Delta t$, and sequentially shifts the received output to store it therein. The parts of the output of the integrator 111a stored respectively in the memory units $\gamma'(n)$ to $\gamma'(n-4)$ of the memory circuit 111c are added together in an adder 111d and the mean value $\gamma_m$ of the added parts is calculated by an averaging circuit 111e. On the other hand, the outputs of the memory units $\gamma'(n)$ to $\gamma'(n-4)$ of the memory circuit 111c and the mean value $\gamma_m$ from the averaging circuit 111e are applied respectively to subtractors 111f to obtain the deviations of the outputs from the mean value $\gamma_m$. The outputs of the subtractors 111f, i.e., the deviations, are applied respectively to squaring circuits 111g to obtain the squares of the outputs of the subtractors 111f. The sum of the squares of the outputs is obtained by an adder 111h. The outputs of the adder 111h are the variances of the five pieces of information stored in the memory units $\gamma'(n)$ to $\gamma'(n-4)$ with respect to the mean value $\gamma_m$.

The output of the adder 111h is compared with the preset value in a comparator 111i and if the output of the adder 111h is less than the preset value, the comparator 111i delivers an output. A holding circuit 111j, when there is an output of the comparator 111i, that is, the variance of the indicial response $\gamma(\alpha_L)$ is less than the preset value, holds and delivers the indicial response $\gamma(\alpha_L)$. On the other hand, when there is no output of the comparator, that is, the variance of the indicial response $\gamma(\alpha_L)$ is greater than the preset value, the holding circuit $111j$ delivers the indicial response $\gamma(\alpha_L)$ which had been held before the variance was greater than the preset value.

As described above, with the provision of the judging circuit 111, the optimizing signal $\bar{x}(t)$ at the normal operation of the boiler 1 is adjusted according to the indicial response $\gamma(\alpha_L)$ and therefore the plant can be operated at its maximum efficiency. If, on the other hand, the indicial response $\gamma(\alpha_L)$ increases or decreases rapidly at the transient operation, the indicial response $\gamma(\alpha_L)$ prior to the variation is held and the adjustment of the optimizing signal $\bar{x}(t)$ is not performed. Accordingly, the stability of the plant is not disturbed since the adverse adjustment of the optimizing signal $\bar{x}(t)$ does not take place.

The variances of the indicial response $\gamma(\alpha_L)$ were obtained from five pieces of information in the previous embodiment, but it is a matter of course that the number is not limited to five but that it should be determined according to the scale of the plant.

Figure 7:
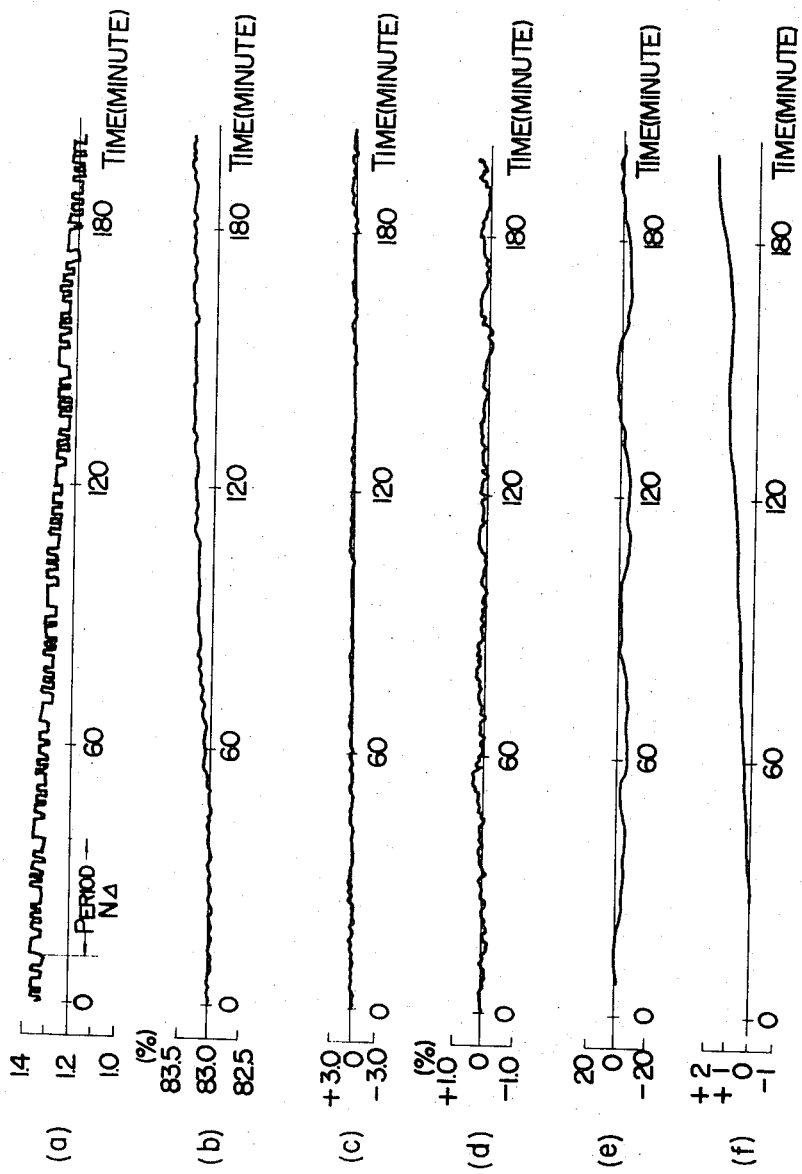
FIG. 7 shows diagrams useful to appreciate the effect of the optimum control according to the embodiment shown in FIG. 1.

FIG. 7 shows the modes of variation in the operation of a boiler using such an optimizing control device as described above. In FIG. 7, the diagram (a) designates the excess air rate, the diagram (b) the boiler efficiency, the diagram (c) the variation in the main steam pressure, the diagram (d) the variation in the boiler efficiency, the diagram (e) the variation in the gradient of the boiler efficiency characteristic, and the diagram (f) the variation in the manipulated variable with respect to the air flow quantity.

As seen from FIG. 7, the boiler efficiency is improved and there is little influence of the search signal upon the main steam pressure, so that the optimum control of the boiler can be performed without any sacrifice of stability.

Figure 8:
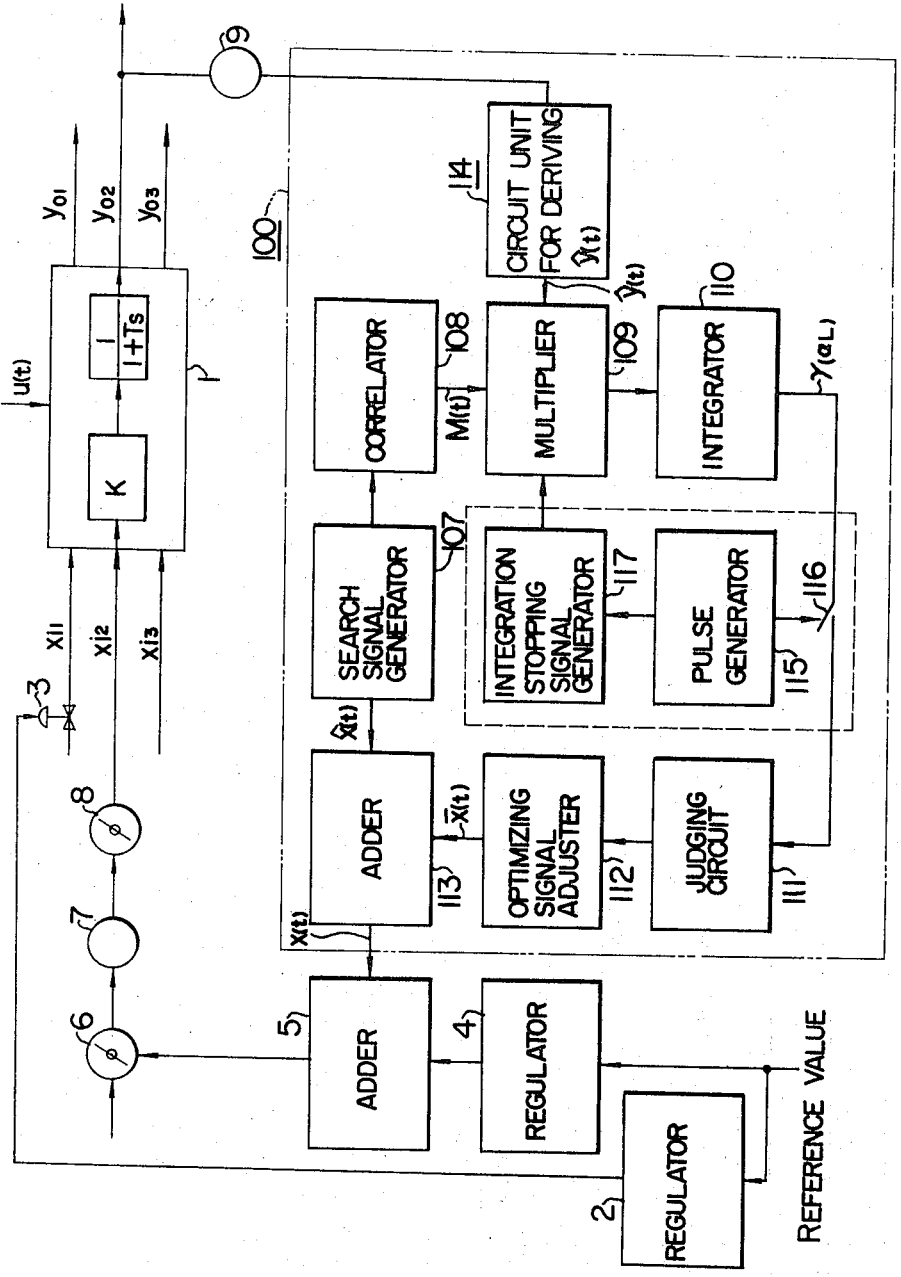
FIG. 8 shows another embodiment of a plant optimizing control device according to the present invention.

FIG. 8 shows another embodiment of an optimizing control device according to the present invention. In FIG. 8, the same reference numerals and characters are applied to like parts or elements as in FIG. 1. The difference from the structure in FIG. 1 is the provision of a unit enclosed by the dotted line and comprising a pulse generator 115, a switch 116 and an integration stopping signal generator 117, in the optimizing control device 100. The block 114 in FIG. 8 is a unit consisting of the circuits 101 to 105 in FIG. 1.

In the circuit of FIG. 8, the optimizing control is separated from the search for the extreme value to give the optimum operating point of the boiler 1. Namely, the pulse generator 115 generates a pulse signal whose period is in synchronism with the period of the search signal $\hat{x}(t)$ and the integration stopping signal generator 117, upon reception of the pulse signal, delivers to the multiplier 109 a signal which starts and stops the arithmetic operation of the correlation signal $M(t)$ and the output $\hat{y}(t)$ of the circuit 114 at intervals of a period of the search signal $\hat{x}(t)$. As a result, the integrator 110 delivers the indicial responses $\gamma(\alpha_L)$ of the boiler efficiency characteristic every other period of the search signal $\hat{x}(t)$.

On the other hand, the switch 116, upon reception of the pulse signal of the pulse generator 115, is turned on and off in such a manner that the output of the integrator 110 is fed to the judging circuit 111 only when the integrator 110 delivers the indicial response $\gamma(\alpha_L)$.

In this way, the extreme value to give the optimum operating point of the boiler 1 is searched within the first period of the search signal $\hat{x}(t)$ and the optimum control is performed within the next period on the basis of the thus searched extreme value. During the period in which the optimum control is to be performed, the search of the extreme value is prevented from being performed by means of the integration stopping signal generator 117. Thus, the search for the extreme value and the optimum control alternate repeatedly with each other at intervals of a period of the search signal $\hat{x}(t)$ so that the stability of accuracy in the search of the extreme value can be much improved.

The above embodiments of the present invention have been described as applied to the boiler of a thermal power plant but they can also be applied to other plants.

For example, in case where the present invention is applied to the turbine of a thermal power station so as to perform the optimum control of the pressure at the entrance of the turbine under lightload operation and thus to enhance the turbine efficiency, the search signal is superposed on the signal representing the main steam pressure and the manipulated variable of the main steam pressure is adjusted on the basis of the optimizing signal to control the heat consumption rate of the turbine.

Further, in case where the present invention is applied to the boiler of a thermal power plant so as to improve the characteristic of the steam temperature control system by performing the optimum control of the parameter of the steam temperature control system located at the exit of the boiler, the search signal is superposed on the signal representing the sprayed water quantity and the manipulated variable of the parameter of the automatic boiler control device is adjusted on the basis of the optimizing signal.

Moreover, in the case where the present invention is applied to a fractioning tower as a plant for the constant pressure distillation of crude petroleum, so as to improve the heat efficiency of the heating furnace by performing optimum control of the quantity of air flowing into the furnace, the search signal is superposed on the signal representing the air flow quantity and the manipulated variable of the air flow quantity is adjusted on the basis of the optimizing signal, to control the fuel consumption quntity.

Furthermore, in the case where the present invention is applied to a naphtha cracking furnace as a plant so as to increase the profitability of the plant by performing optimum control of the flow quantity of oxygen needed when naphtha is decomposed to create acetylene and ethylene, the search signal is superposed on the signal representing th oxygen flow quantity and the manipulated varible of the the flow quantity is adjusted on the basis of the optimizing signal to control the appropriate ratio of acetylene to ethylene.

In the preceding embodiments, the optimum control of the boiler is performed by superposing the search signal $\hat{x}(t)$ upon the optimizing signal $\bar{x}(t)$ and by adjusting the preset value of the manipulated variable serving as the input of the boiler. However, the same result can be obtained also in the case where the plant input on which the search signal is superposed is separated from the plant input on which the optimizing signal is superposed, e.g. in the case of the turbine of a thermal power station.

The pseudo-random binary signal such as the M-sequence signal serving as search signal has such a specific property that it can be used for the optimum control of a plant having a plurality of input and a single output as well as of such a plant described above as having a single input and a single output.

What we claim is:

1. A plant optimizing control device in which a slight variation is caused in the input by applying a search signal to the input and the preset value of the input is adjusted on the basis of an optimizing signal so as to cause the operating point of the plant to give an optimum point by measuring the variation in the output corresponding to the variation in the input, the device comprising a first means for generating a periodical signal consisting of pseudo-random binary signals and serving as the search signal; a second means for obtaining a correlating signal with respect to the input and output of the plant, from a running mean within a period of the signal of the first means, the running mean being made in accordance with the expected plant characteristic; a third means for detecting the output of the plant, estimating from the detected value a dc component corresponding to the optimizing signal and obtaining a signal corresponding to the search signal which is equivalent to the detected value minus the dc component; a fourth means for obtaining from the outputs of the second and the third means the gradient of the variation in the output of the plant; and a fifth means for obtaining the optimizing signal of the plant from the forth means.

2. A plant optimizing control device as claimed in claim 1, wherein the first means comprises a first n-bit shift register, a second $\{2^n - (n+1)\}$-bit shift register connected in series with the first shift register, and an arithmetic operating circuit which logically operates the values of the $n$-th bit and an arbitrary bit of the first shift register and feeds the logically operated result back to the first shift register.

3. A plant optimizing control device as claimed in claim 2, wherein the correlation signal obtained by the second means is the difference between a first running mean obtained from the arbitrary bits of the first and the second shift registers and a second running mean obtained from other bits of the first and the second shift registers.

4. A plant optimizing control device as claimed in claim 1, wherein the dc component estimated by the third means is calculated from the initial value and the gradient of a straight line connecting a plurality of integrated values of the output of the plant in such a manner that the sum of the squares of the deviations of the integrated values from the straight line is minimized, the integrated values of the output of the plant being stored time-sequentially at a predetermined period in a memory means consisting of a plurality of memory units.

5. A plant optimizing control device as claimed in claim 1, wherein the fifth means is further provided with a sixth means which judges whether the variance of the output of the fourth means is less than the preset value or not, which delivers the output of the fourth means as it is when the output is less than the preset value and which delivers that output of the fourth means which had been delivered by the fourth means before the output exceeded the preset value, when the output is greater than the preset value.

6. A plant optimizing control device as claimed in claim 5, wherein the sixth means comprising a memory means consisting of a plurality of memory units which store the integrated values of the output of the fourth means time-sequentially at a predetermined period; an averaging means for obtaining the mean value of the contents of the memory means; an adding means for calculating the sum of the squares of the deviations of the content of the memory means from the mean value; a comparing means for comparing the output of the adding means with the preset value and delivering an output when the output of the adding means is less than the preset value; and a means which delivers the output of the fourth means as it is when there is an output of the comparing means and which delivers the output of the fourth means produced before the cease of the output of the comparing means when there is no output of the comparing means.

7. A plant optimizing control device as claimed in claim 1, wherein the fourth means comprises a multiplying means for calculating the product of the outputs of the second and the third means and an integrating means for integrating the output of the multiplying means.

8. A plant optimizing control device as claimed in claim 7, wherein the fourth means is further provided with a pulse generating means for generating a pulse signal whose period is in synchronism with that of the search signal generated by the first means; an operation stopping means for receiving the pulse signal and stopping the operation of the multiplying means every other period of the search signal; and a switching means for receiving the pulse signal and applying the output of the integrating means to the fifth means during the period in which the multiplying means is at operation.

* * * * *